(12) United States Patent
Blair et al.

(10) Patent No.: US 7,432,660 B2
(45) Date of Patent: Oct. 7, 2008

(54) IC-BASED LOW COST RELIABLE ELECTRONIC BALLAST WITH MULTIPLE STRIKING ATTEMPTS AND END OF LAMP LIFE PROTECTION

(75) Inventors: David Anthony Blair, New Market, AL (US); Peter Shackle, Rolling Hills Estates, CA (US); Ruhe Shi, Madison, AL (US)

(73) Assignee: Universal Lighting Technologies, Inc., Madison, AL (US)

(*) Notice: Subject to any disclaimer, the term of this patent is extended or adjusted under 35 U.S.C. 154(b) by 435 days.

(21) Appl. No.: 11/004,645

(22) Filed: Dec. 3, 2004

(65) Prior Publication Data

US 2007/0164684 A1 Jul. 19, 2007

Related U.S. Application Data

(60) Provisional application No. 60/526,723, filed on Dec. 3, 2003.

(51) Int. Cl.
*H05B 37/02* (2006.01)
(52) U.S. Cl. .............................. 315/209 CD; 315/226; 315/291; 315/360
(58) Field of Classification Search .................. 315/201, 315/205, 209 R, 224, 225, 226, 209 CD, 315/291, 307, 308, 360
See application file for complete search history.

(56) References Cited

U.S. PATENT DOCUMENTS

| 5,436,529 | A | 7/1995 | Bobel |
| 5,493,180 | A | 2/1996 | Bezdon et al. |
| 5,500,576 | A | 3/1996 | Russell et al. |
| 5,636,111 | A | 6/1997 | Griffin et al. |
| 5,770,925 | A | 6/1998 | Konopka et al. |
| 5,945,788 | A | 8/1999 | Li et al. |
| 5,969,483 | A | 10/1999 | Li et al. |
| 5,982,106 | A | 11/1999 | Bobel |
| 6,127,786 | A | 10/2000 | Moison |
| 6,169,369 | B1 | 1/2001 | Nerone et al. |
| 6,211,623 | B1 | 4/2001 | Wilhelm et al. |
| 6,232,727 | B1* | 5/2001 | Chee et al. ................ 315/307 |
| 6,316,887 | B1 | 11/2001 | Ribarich et al. |
| 6,366,032 | B1 | 4/2002 | Allison et al. |

(Continued)

OTHER PUBLICATIONS

European 0061730, Inui, Jun. 10, 1982.

(Continued)

*Primary Examiner*—Thuy Vinh Tran
(74) *Attorney, Agent, or Firm*—Waddey & Patterson; Mark J. Patterson

(57) ABSTRACT

The present invention relates generally to a simple, low cost ballast for fluorescent lamps that incorporates an integrated circuit and a number of ballast protection functions to cost effectively enhance its reliability. End of lamp life circuitry is provided to shut down the ballast when rectification currents due to lamp aging exceed a predetermined level. This circuitry also functions to stop the ballast operation when the lamp's voltage exceeds a predetermined cutoff level for a set period of time. Re-ignition circuitry is provided that restarts the ballast when new lamps are installed without shutting off the ballast. Multiple striking attempt circuitry is provided that initiates a predetermined number of striking attempts such that cold or old lamps are quickly ignited without the introduction of excessive flickering.

17 Claims, 3 Drawing Sheets

U.S. PATENT DOCUMENTS

| | | |
|---|---|---|
| 6,420,838 B1 | 7/2002 | Shackle |
| 6,501,225 B1 | 12/2002 | Konopka |
| 6,552,494 B2 | 4/2003 | Randazzo et al. |
| 6,914,395 B2 * | 7/2005 | Yamauchi et al. ............ 315/308 |
| 7,015,652 B2 * | 3/2006 | Shi ............................ 315/224 |
| 2002/0105283 A1 | 8/2002 | Murakami et al. |
| 2003/0025464 A1 | 2/2003 | Konopka |

OTHER PUBLICATIONS

European 0576991, Matsuzawa et al, May 1, 1994.

* cited by examiner

IC-BASED LOW COST RELIABLE ELECTRONIC BALLAST WITH MULTIPLE STRIKING ATTEMPTS AND END OF LAMP LIFE PROTECTION

CROSS-REFERENCE TO RELATED APPLICATIONS

This application is a Non-Provisional Utility application which claims benefit of U.S. patent application Ser. No. 60/526,723 filed Dec. 3, 2003, entitled "IC-Based Low Cost Reliable Electronic Ballast with Multiple Striking Attempts and End of Lamp Life Protection" which is hereby incorporated by reference.

STATEMENT REGARDING FEDERALLY SPONSORED RESEARCH OR DEVELOPMENT

Not applicable

REFERENCE TO SEQUENCE LISTING OR COMPUTER PROGRAM LISTING APPENDIX

Not applicable

BACKGROUND OF THE INVENTION

The present invention relates generally to electronic ballasts for gas discharge lamps. Electronic ballasts for gas discharge lamps are well known in the art and include a variety of different types of protection features and capabilities. For example, the prior art includes electronic ballasts that use end of lamp life protection circuits that are designed to protect the electronic ballast and the gas discharge lamp from being damaged by an end of lamp life condition. The prior art also includes electronic ballasts that include re-ignition circuits that are designed to automatically ignite a gas discharge lamp when it is reconnected to the electronic ballast. In addition, the prior art includes electronic ballasts that include multiple striking circuits that are designed to generate multiple striking attempts that can be used to ignite cold, new, or old gas discharge lamps that can be difficult to ignite with a single strike.

An end of lamp life condition is a condition that occurs when a gas discharge lamp reaches the end of its effective operating lifetime. When this occurs, the gas discharge lamp can begin to rectify the AC current applied to the lamp. The gas discharge lamp can rectify the AC current in a positive direction, commonly referred to as positive rectification, or in a negative direction, generally referred to as negative rectification. Regardless of the direction of rectification, the rectification causes the peak to peak voltage across the lamp to gradually increase and, as a result, the power drawn by the gas discharge lamp, and thus the ballast, increases as the lamp ages. This is an undesirable condition in that the ballast is typically very sensitive to the increased power it has to deliver to the lamp and it will often overheat and be destroyed by the increased power. This situation can also cause damage to the gas discharge lamp.

Electronically ballasted T4 and T5 lamps already require end of lamp life (EOLL) shutdown protection and this type of protection is becoming more and more accepted as an industrial standard. The end of lamp life protection circuits in the prior art are designed to sense an end of lamp life condition in a gas discharge lamp and to compensate for this condition before the electronic ballast or the gas discharge lamp can be damaged by the various end of lamp life conditions that occur. Typically, the protection circuits are designed to command the electronic ballast to simply shut down completely. Alternatively, the protection circuits can cause the electronic ballast to reduce the power delivered to the gas discharge lamp to a safe level that will not damage the electronic ballast or the gas discharge lamp.

It is also known that new and/or cold lamps are hard to start because of the inactivity of the mercury contained in the lamps. For relatively old lamps, more striking efforts are needed to ignite the lamp due to the depletion of their fluorescent coatings over time. Thus, the ability to perform multiple striking attempts is a feature that is designed to compensate for such hard-striking lamps. In addition, an automatic re-ignition function is often provided to make lamp replacement easier by insuring that the ballast will restart the lamps after the expired lamps have been replaced by new ones. However, prior art solutions to these problems are expensive, energy inefficient and often ineffective.

One example of an electronic ballast including end of lamp life protection is described in U.S. Pat. No. 6,420,838, issued to Shackle on Jul. 26, 2002 and entitled "Fluorescent Lamp Ballast with Integrated Circuit". The '838 patent is directed toward a series resonant parallel-loaded (SRPL) circuit ballast with a DC blocking capacitor located in the rear end. The circuit has full end of lamp life protection in which the DC voltages between a half-bridge inverter and the blocking capacitor are compared. The difference between the voltages determines the extent of lamp DC rectification. Excessive lamp voltage protection is achieved by detecting the lamp current spike. However, such a system does not provide multiple striking protection and the required components are complicated and expensive.

Allison, et al., in U.S. Pat. No. 6,366,032 entitled "Fluorescent Lamp Ballast with Integrated Circuit", discloses an interdependent circuit for the same ballast topology having all of the protection functions except for the DC lamp rectification. However, all the protections are heavily dependent on a slow-response EOLL shut down circuit and have difficulty fully cooperating with each other.

U.S. Pat. No. 5,925,990, issued to Crouse et al. on Jul. 20, 1999 and is entitled "Microprocessor Controlled Electronic Ballast." In the '990 patent, Crouse, et al. employs a powerful microprocessor as the ballast control to achieve the desired level of protection. Unfortunately, such a microprocessor is expensive and requires additional hardware such as a crystal and voltage regulator to function properly. The software programming required is also a time consuming endeavor that should be avoided if possible.

Although the prior art does teach several different types of protection circuits for electronic ballasts, these circuits have several disadvantages. For example, end of lamp life protection circuits taught by the prior art must be designed to handle very high currents and, as a result, dissipate large amounts of power. This makes these types of protection circuits inefficient. In addition, many prior art end of lamp life protection circuits sense DC rectification end of lamp life conditions or excessively high AC end of lamp life conditions, but not both. Prior art re-ignition circuits can also inadvertently attempt to reignite a lamp load even after a ballast has been shut down by another protection circuit.

In addition to the above-referenced disadvantages of prior art protection circuits, the inventors have also recognized that the prior art does not appear to teach one protection circuit that includes all of the desired protection and capabilities described above in an inexpensive, simple but reliable package. The prior art ballasts require expensive microprocessors or complicated circuits including a large number of component parts to accomplish each protection feature separately, both of which are very undesirable from the consumer and the manufacturer viewpoint.

Therefore, what is needed is an electronic ballast that includes end of lamp life protection, re-ignition capabilities, and multiple striking capabilities in an inexpensive, simple package and that overcomes the disadvantages of prior art electronic ballasts.

BRIEF SUMMARY OF THE INVENTION

A preferred embodiment of the present invention is directed toward an electronic ballast for igniting and powering at least one gas discharge lamp. The electronic ballast includes an AC/DC converter circuit for receiving an AC voltage and converting the AC voltage into a DC voltage. An integrated circuit controls the ballast. An inverter circuit receives the DC power and produces an output AC voltage. An end of lamp life circuit detects a positive or negative DC rectification current exceeding a predetermined threshold being produced by an installed gas discharge lamp and turns off the integrated circuit if such predetermined threshold is exceeded. The end of lamp life circuitry further detects excess symmetric lamp voltages and shuts down the integrated circuit if such excess symmetric lamp voltages are detected. A multiple striking circuit performs a predetermined number of striking attempts to light an installed light. The multiple striking circuit includes a charge pump and a storage capacitor wherein each striking attempt causes the charge pump to provide an amount of charge to the storage capacitor. The storage capacitor produces a turn-off voltage for disabling the integrated circuit after receiving a predetermined amount of charge from the charge pump. A re-ignition circuit connected to the inverter circuit automatically attempts to ignite a new lamp that has been installed in the ballast. The re-ignition circuitry utilizes a low voltage power supply to detect the presence of installed lamp filaments, a filament voltage to suppress a ballast starting signal after ignition, and a capacitor charged from the low voltage power supply to trigger a ballast starting procedure. A DC blocking capacitor isolates the inverter circuit from DC voltages in the end of lamp life circuit, multiple striking circuit and/or re-ignition circuit.

Another embodiment of the present invention is directed toward an electronic ballast for igniting at least one gas discharge lamp. The ballast includes an integrated circuit for controlling the ballast. An inverter receives a DC voltage and applies the DC voltage to a series-resonant tank such that an AC voltage is produced. A pair of output terminals receives the at least one gas discharge lamp and applies the produced AC voltage to the gas discharge lamp. Re-ignition circuitry detects if a lamp is connected between the output terminals and initiates a lamp ignition procedure when a newly installed lamp is detected between the output terminals. The re-ignition circuitry utilizes a voltage across the output terminals to detect the presence of an installed lamp and a charged capacitor to initiate a ballast ignition procedure. The re-ignition circuitry uses a voltage across the output terminals to suppress the ignition procedure after a lamp has been ignited. Multiple striking attempt circuitry is provided that includes a charge collecting capacitor for triggering a predetermined number of striking attempts to attempt to ignite a lamp wherein the striking attempts are terminated when the lamp is ignited or the predetermined number of striking attempt is exceeded. The multiple striking attempt circuitry includes a charge pump. Each striking attempt causes the charge pump to provide an amount of charge to the charge collecting capacitor and the capacitor produces a turn-off voltage for disabling the ballast after receiving an amount of charge from the charge pump. End of lamp life detection circuitry detects an end of lamp life condition and disables the ballast when such an end of lamp life condition is detected. The end of lamp life circuit detects both positive and negative rectification voltages across the output terminals and disables the ballast if the detected voltages exceed a predetermined value. The end of lamp life circuitry also detects excess symmetric lamp voltages and disables the ballast if the detected voltages exceed a predetermined value. A DC blocking capacitor isolates the inverter from DC voltages.

Yet another embodiment of the present invention is directed toward a method of protecting an electronic ballast for igniting and powering at least one gas discharge lamp from damaging conditions. In accordance with the method, positive and negative voltages developed across a lamp installed in the ballast are monitored to determine if an end of lamp life condition has occurred and the ballast is disabled if such a condition is detected. Installation of a new lamp in the ballast is detected and an ignition procedure is initiated if a newly installed lamp is detected. A voltage across a pair of output terminals is used to detect the presence of the installed lamp and a charged capacitor is used to initiate a ballast ignition procedure. The voltage across the output terminals is also used to suppress the ignition procedure after the lamp has been ignited. Ignition strikes are produced when an ignition procedure is initiated until an installed lamp is ignited or until a predetermined number of strikes have been produced. A blocking capacitor is used to isolate an output of an inverter of the ballast from selected DC voltages.

DETAILED DESCRIPTION OF THE INVENTION

One embodiment of the present invention is directed toward providing a low cost, reliable electronic ballast having: (1) an end of lamp life protection feature, (2) a multiple striking attempt feature and/or (3) a re-ignition feature all contained in one economical, simple and reliable package. More particularly, the invention is directed toward a gas discharge lamp ballast with a series-resonant, parallel-loaded tank for at least one gas discharge lamp having a DC blocking capacitor located in the front end of the output of the half-bridge inverter such that all the protection functions are independent of each other. Due to the independent nature of the protection functions, a ballast in accordance with the present invention may incorporate any or all of the advanced features.

Figure 1:
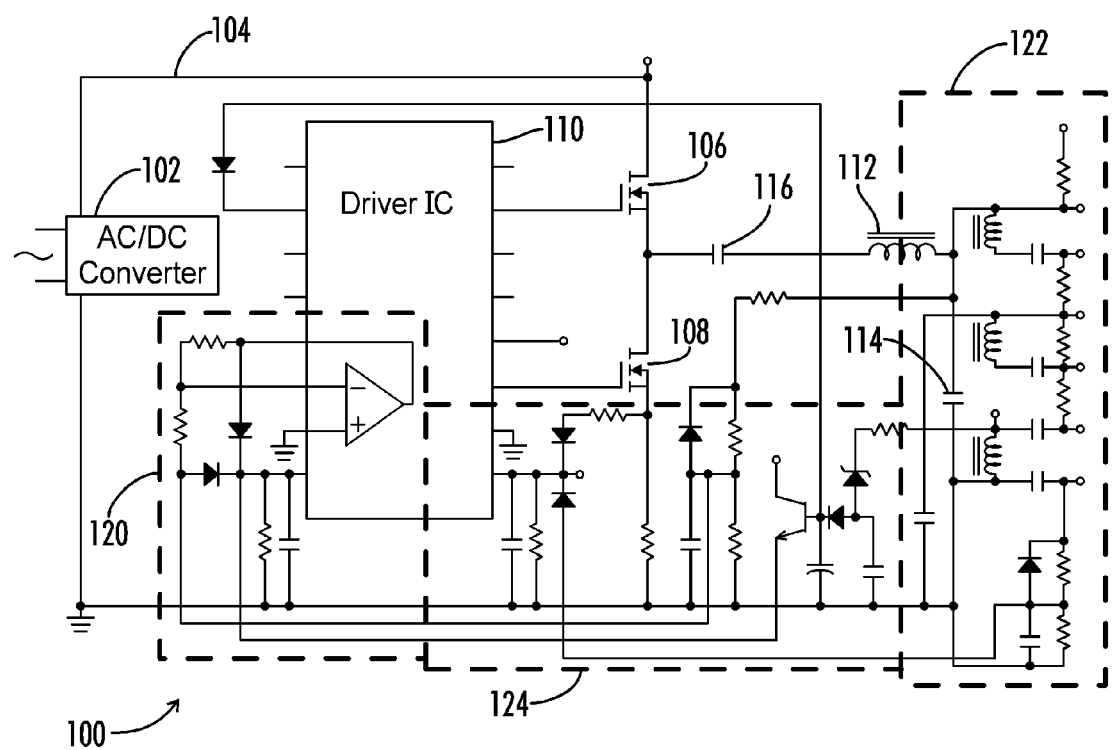
FIG. 1 is a schematic diagram of integrated circuit based electronic ballast constructed in accordance with one embodiment of the present invention.

Referring now to FIG. 1, a schematic diagram of an IC-based, low cost electronic ballast 100 in accordance with one embodiment of the present invention is shown. The ballast includes an AC to DC converter 102 which provides a constant DC bulk voltage 104 for use by the ballast. Preferably, the AC power source for the converter 102 is simply a local electric utility company's AC power supply that is accessed using a common electrical outlet found in a typical home or business. AC/DC converters 102 are well known in the art and any one of a variety of different types of rectifiers may be used with the present invention. For example, the prior art includes simple rectifiers that include a single diode, half bridge rectifiers that include two diodes, and full bridge rectifiers that include four diodes.

A half-bridge inverter comprised of transistors 106 and 108 is driven by a driver integrated circuit (IC) (microcontroller) 110. In other embodiments, a full bridge inverter circuit, a push pull circuit, or a parallel resonant LC circuit may be used to drive the transistors 106 and 108. The inverter microcontroller 110 can be a L6574—CFL/TL Ballast Driver Preheat and Dimming microcontroller manufactured and sold by ST Microelectronics. However, in alternative embodiments, various other microcontrollers may be used as well. The driver IC 110 is configured to alternately switch transistors 106 and 108 on and off at a predetermined frequency. A series resonant, parallel-loaded output circuit comprised of series connected inductor 112 and capacitor 114 is attached between the series connected transistors 106 and 108 through a DC blocking capacitor 116. The DC blocking capacitor 116 serves to isolate the transistors 106 and 108 from DC currents produced in other sections of the electronic ballast 100.

FIG. 1 includes dashed boxes 120, 122 and 124 showing the general topology of the EOLL protection sub-circuits 120, re-ignition circuitry 122, and multiple striking circuitry 124. The respective circuits 120, 122 and 124 are discussed in more detail herein below with regard to FIGS. 2-4. The sub-circuits 120, 122 and 124 are included for ease of understanding and should not be interpreted to mean that a particular sub-circuit 120, 122 and 124 includes, or must include, all of the components included in the sub-circuits. Because of the layout of the detailed schematic shown in FIG. 1, the sub-circuits 120, 122 and 124 may lack some components that are required by a particular functional circuit or include some additional circuit components that perform other functions. Those skilled in the art will appreciate that it can be difficult to precisely separate and isolate one portion of a functioning sub-circuit from the circuit as a whole.

As discussed in more detail below with respect to FIGS. 2, 3 and 4, the EOLL protection circuitry 120 functions to protect against high voltage and DC rectification problems caused by degradation of a gas discharge lamp over time. The re-ignition circuitry 122 insures that new lamps can be safely installed and ignited while the ballast remains powered 100. The multiple striking circuitry 124 serves to help ignite new, cold or otherwise difficult to ignite lamps without introducing annoying flickering. The DC blocking capacitor 116 helps isolate the various circuit functions from one another such that they can be individually configured and implemented.

As also shown in FIG. 1, the ballast 100 includes a variety of additional conventional circuit components that are well known in the art and are not discussed in detail as they are not necessary for a proper understanding of the present invention. For example, the resistor/capacitor pairs connected to pins 8 and 9 of the inverter driver integrated chip 110 are used to filter noise out of the control signals applied to the pin as is well known in the prior art.

Figure 2:
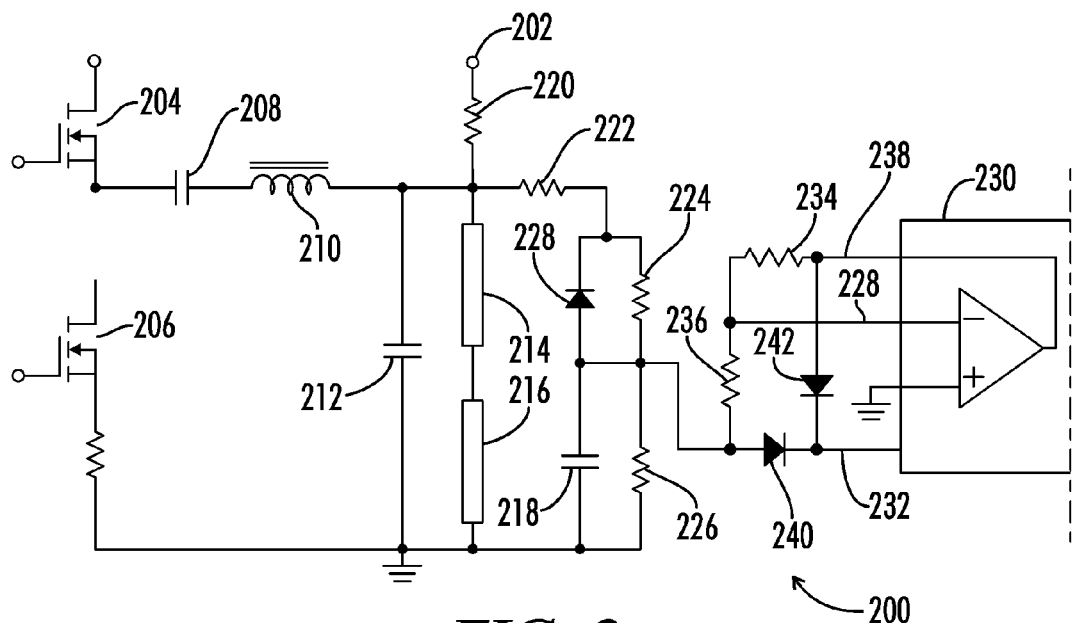
FIG. 2 is a schematic diagram of an end-of-lamp life detection circuit constructed in accordance with a preferred embodiment of the present invention.

Referring now to FIG. 2, a preferred end-of-lamp life (EOLL) detection circuit 200 constructed in accordance with one embodiment of the present invention is shown. The EOLL protection circuit 200 is operable to sense the voltage applied by the ballast across the lamp load comprised of lamps 214 and 216 and to generate an end of lamp life control signal 232 when the sensed voltage exceeds a predetermined level for a predetermined time period that turns off the ballast driver IC 230. The EOLL control signal can also be used to cause the ballast to enter an end of lamp life protected state so that the ballast and the lamp load cannot be damaged by an end of lamp life condition. As is well known in the art, gas discharge lamps 214 and 216 included in the lamp load of the present invention rectify AC current, i.e., generate a DC current in response to an applied AC current, as they approach the end of their effective operating lifetimes. The lamp rectification due increasing age may generate a positive DC voltage, referred to as positive rectification, or a negative DC voltage, referred to as negative rectification. In addition, in some cases, the failure of lamps 214 and 216 causes an excessively high symmetric voltage to appear across the lamps.

The end of lamp life protection circuit 200 includes a half-bridge inverter comprised of transistors 204 and 206 connected to a series resonant tank comprised of DC blocking capacitor 208, resonant inductor 210 and resonant capacitor 212. The two series connected lamps 214 and 216 are connected in parallel with resonant capacitor 212. The gas discharge lamps 214 and 216 include one or more gas discharge lamps that operate using AC voltages and currents. Gas discharge lamps 214 and 216, such as fluorescent lamps, are well known in the art and any one of a variety of these lamps may be used with the present invention.

The circuit 200 detects (in either direction) the lamps' DC rectification and any excessive symmetric lamp voltage. In normal operation, the voltage across the large value capacitor 218 has two roots: positive DC biased voltage derived from the DC voltage divider path defined by power supply 202 and resistors 220, 222, 224 and 226, and the relatively small value of the resistance of the lamps 214 and 216, and negative charging from the top filament through anti-parallel diode 228. When there is no DC lamp rectification and the voltage across lamps 214 and 216 is normal, these two voltage components can be made to cancel each other out by selecting the appropriate values of the resistors 220, 222, 224 and 226. The total effect of properly selecting the resistive values is that there is no positive voltage on capacitor 218 when the lamps 214 and 216 are properly operating. Thus, when the ballast is operating normally, the inverting input pin 228 of the IC 230 internal operational amplifier is zero and there is no triggering voltage applied to the shut-down pin 232 of IC 230.

However, when positive lamp rectification does occur, the DC voltage divider 220, 222, 224 and 226 will reflect this positive voltage. The voltage across the divider capacitor 218, and thus the inverting input 228, will be positive. Since the operational amplifier in the IC 230 is employed as a voltage inverter with a gain determined by the ratio of resistor 234 to resistor 236, the output on pin 238 will be of negative value. Due to the unidirectional conduction of diodes 240 and 242, IC 230 pin 232 will only see a positive voltage after the forward voltage drop of diode 240. The IC shutdown pin 232 is the inverting input to an internal comparator which compares the input voltage with an internal reference voltage that is preferably set to 0.6V. The DC rectification level is preferably set to around 45V and the ballast shut down within 30 seconds of detecting such a lamp rectification voltage. The capacitance of capacitor 218 is preferably chosen to be large so that the time constant is long enough to avoid detection of a false triggering signal which might be generated during a pre-heating stage. When the positive rectification comes to 45V, the voltage cross the capacitor 218 will be 1.2V and, thus, the IC 230 will be shut down and remain in a standby mode of operation. Likewise, when the negative rectification becomes −45V, the voltage on capacitor 218 will also mirror the negative voltage accordingly. This negative voltage will be inverted and amplified through the IC's 230 internal operational amplifier so that the output pin 238 of the operation amplifier will be 1.2V with the same time constant. In this way, diode 242 conducts and diode 240 is reverse biased. Thus, the shut down pin 232 of IC 230 will be triggered to protect the ballast from damaging operation regardless of whether the DC lamp rectification that occurs is positive or negative in polarity.

Similar to DC lamp rectification, when the lamp voltage increases, the voltage on capacitor 218 decreases due to the negative charging through diode 229. This negative voltage is then inverts by the operational amplifier in IC 230. Eventually, if the lamp 214 and 216 voltage exceeds the predetermined rectification value, the operational amplifier output pin 238 will rise to 1.2V and trigger IC shut-down pin 232 which turns off IC 230. Hence, the ballast system is also protected from excessive symmetric voltages that arise from lamp degradation.

Customers prefer lamp ballasts that provide a multiple striking capability for use in striking hard to ignite lamps. Cold, new, and old lamps can often be difficult to ignite using only a single striking attempt. The ballast protection circuit of the present invention commands the ballast to generate multiple striking attempts in order to ignite these types of lamps. The ballast protection circuit of the present invention, however, is not designed to provide an indefinite number of strikes. Circuits that provide an indefinite number of striking attempts can cause the lamp to repeatedly flash off and on. Not surprisingly, many customers find this flashing to be annoying. Accordingly, the ballast protection circuit of the present invention preferably provides an adjustable, limited number of striking attempts to prevent this type of situation from occurring.

Figure 3:
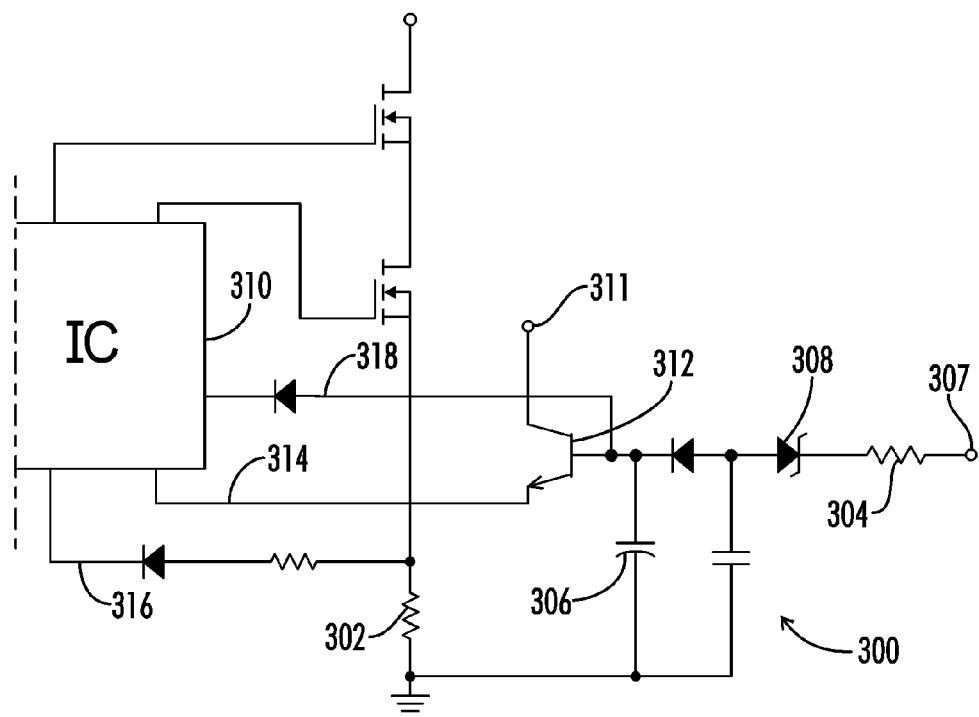
FIG. 3 is a schematic diagram of a multiple striking attempt circuit constructed in accordance with one embodiment of the present invention.

FIG. 3 illustrates one embodiment of the multiple striking attempt circuitry 300 of the present invention shown in FIG. 1. The circuitry 300 is composed of two main parts, the restarting circuitry and the charge pump. The restarting is accomplished with the half-bridge current sensing resistor 302. During the striking phase, the voltage across sensing resistor 302 grows as the frequency sweeps down from the relatively higher preheat frequency to the relatively lower frequency that is close to the unloaded resonance frequency. Once the voltage across resistor 302 grows to a sufficiently level, the re-ignition pin 316 is triggered and the striking process is restarted.

The charge pump circuitry, comprised of resistor 304 and electrolytic capacitor 306, receives power from the low voltage potential of the top blue filament of the lamp $V_{Fbt}$ 307 through the zener diode 308. Normally, when the ballast is operating in the steady state and during the preheat stage, the peak voltage of the blue auxiliary winding 307 is less than the breakdown voltage of the zener diode 308. Thus, during normal operation, there is no charging of the capacitor 306 at all. On the other hand, during the striking phase, the resonant circuit operates around the resonance to provide the high open circuit voltage necessary to strike the lamps by sweeping down the driven half bridge frequency. The peak voltage across the blue auxiliary winding grows correspondingly until it is higher than the zener diode 308 breakdown voltage and the charging of capacitor 306 begins. This charging ends once the voltage across the sensing resistor 302 reaches 1.2V and, thus, triggers re-ignition pin 316 on the IC 310.

The ballast is supposed to be able to start a lamp on the first try if the lamp is in good shape. However, for an aging lamp or even a new lamp, a single striking is not guaranteed to light the lamp. Nevertheless, the lamp will be easier to strike after the first attempt if another try is made immediately. With the present invention some charge will be placed on the capacitor 306 and will remain there after each striking attempt. More energy will be stored with each strike and, thus, a stepped-up voltage level will be built up on capacitor 306 with each additional strike. When the voltage across the capacitor 306 reaches the required conduction voltage (typically 0.6V) for transistor 312, the leakage through the filter created by resistor and capacitor on pin 314 of the IC 310 (shown in FIG. 3) will be provided by the power supply 311 instead of from the charge pump capacitor 306. The voltage across the capacitor 306 thus accumulates steadily until it reaches to around 1.2V. When the voltage builds up to 1.2V, the shutdown pin 314 on the IC 310 will be triggered. The lamp will be assumed bad after the determined number of striking attempts has occurred and the ballast will shut down. The voltage on pin 318 is normally at 2V and drops to 0V when the IC 310 shuts down. Pin 318 is used to quickly discharge the accumulated energy in the capacitor 306 after the IC 310 shuts down. Typically, the maximum number of striking attempts is set from 2 to 15 depending on the different lamp loads since to do so is considered safe and does not produce annoying flickering.

It is desirable for a ballast to automatically shut down, or to be placed in some other type of protected state, i.e., a disconnected protected state, when a lamp is disconnected from the ballast to ensure that the high voltage present at the lamp connection terminals of the ballast output circuit does not pose any harm to customers or the ballast. Customers also prefer ballasts that automatically reignite, i.e., ignite a newly installed gas discharge lamp, when a bad lamp is disconnected from the ballast and a new lamp is connected to the ballast while the input power remains on. Therefore, as set forth in more detail below, a preferred embodiment of the present invention has re-ignition circuitry that performs these functions.

Figure 4:
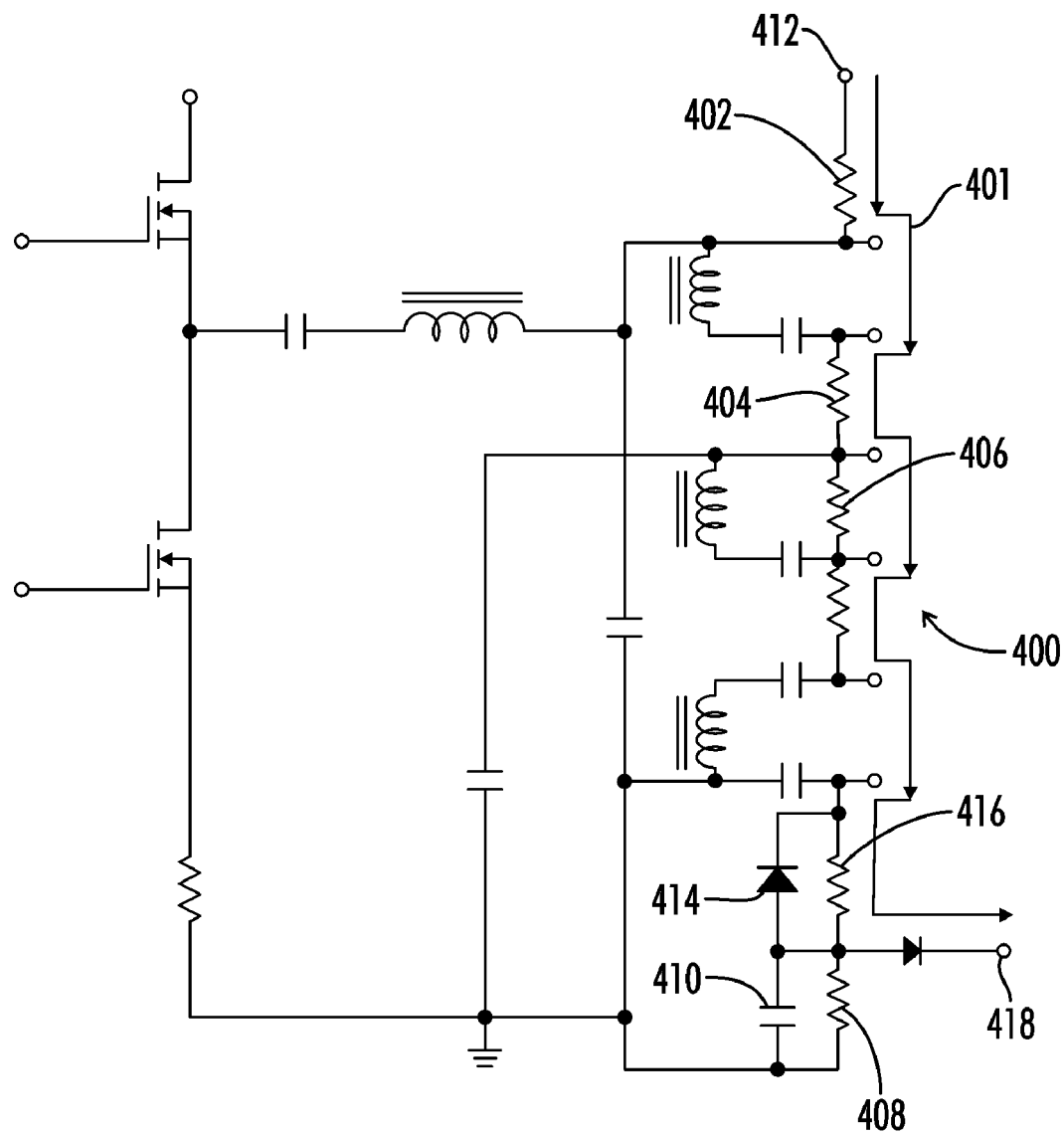
FIG. 4 is a schematic diagram of a filament sensing and re-ignition circuit constructed in accordance with a preferred embodiment of the present invention.

Referring now to FIG. 4, the re-ignition circuit is operable to sense lamp filament continuity when the lamp load is reconnected to the ballast after previously being removed and to generate an ignition control signal that can be used to cause the inverter circuit to attempt to ignite the newly installed lamp load. It should be noted that the power applied to the ballast remains on during the disconnection and reconnection process. In addition, as explained in more detail below, the re-ignition control signal is only generated after the lamp load has been disconnected for a predetermined amount of time.

In FIG. 4, the DC path 401 from DC power supply 412 is only possible when both the red filament and the blue filament are present for each installed lamp. The DC voltage divider capacitor 410 is biased from the power supply 412. In the steady state, a positive DC bias voltage is formed by the parallel connection of filament path resistors 402, 404, 406 and 408 and end-of-lamp life sensing circuit resistors 222, 224, and 226 shown in FIG. 2 connected in series with resistor 402. At the same time, however, the voltage across capacitor 410 is cancelled by the negative charging voltage provided by diode 414, resistors 416 and 408 and capacitor 410. Consequently, there will be no trigger voltage provided to the shutdown pin of the inverter IC shown in FIG. 1 during steady state operation.

The DC voltage will increase on top of the red filament when the ballast is powered but remain constant if the filament sensing path through the lamps is broken. Whenever good lamps are placed into the sockets, the filament sensing path will be completed and the voltage across capacitor 410 will be only the positive DC biased voltage. This voltage will be charged quickly and come to 1.2V to trigger the re-ignition pin 418 (shown as pin 9 of U2 in the FIG. 1). The ballast starting procedure will then be initiated by the ballast IC.

Thus, although there have been described particular embodiments of the present invention of a new and useful IC-Based Low Cost Reliable Electronic Ballast with Multiple Striking Attempts and End of Lamp Life Protection, it is not intended that such references be construed as limitations upon the scope of this invention except as set forth in the following claims.

What is claimed is:

1. An electronic ballast for igniting and powering at least one gas discharge lamp, said electronic ballast comprising:
   an AC/DC converter circuit for receiving an AC voltage and converting said AC voltage into a DC voltage;
   an integrated circuit for controlling said ballast;
   an inverter circuit for receiving said DC power and producing an output AC voltage;
   end of lamp life circuitry for detecting a positive or negative DC rectification current exceeding a predetermined threshold being produced by an installed gas discharge lamp and turning off said integrated circuit if such predetermined threshold is exceeded;
   a multiple striking circuit for performing a predetermined number of striking attempts to ignite an installed lamp;
   re-ignition circuitry connected to the inverter circuit for automatically attempting to ignite a new lamp that has been installed in said ballasts; and
   wherein said end of lamp life circuitry further detects excess symmetric lamp voltages and shuts down said integrated circuit if such excess symmetric lamp voltages are detected for more than a predetermined amount of time.

2. The ballast of claim 1 wherein said multiple striking circuit comprises a charge pump and a storage capacitor wherein each striking attempt causes said charge pump to provide an amount of charge to said storage capacitor and said storage capacitor produces a shut down signal for disabling said integrated circuit after receiving a predetermined amount of charge from said charge pump.

3. The ballast of claim 1 wherein said re-ignition circuitry utilizes a DC power supply to detect the presence of installed lamp filaments, utilizes a filament voltage to suppress a ballast starting signal after ignition, and utilizes a capacitor charged from said DC power supply to trigger a ballast starting procedure.

4. The ballast of claim 1 wherein said re-ignition circuitry utilizes a filament voltage to suppress a ballast starting signal after ignition.

5. The ballast of claim 1 wherein said re-ignition circuitry utilizes a capacitor charged from a power supply to trigger a ballast starting procedure.

6. An electronic ballast for igniting at least one gas discharge lamp, said ballast comprising:
   an integrated circuit for controlling said ballast;
   an inverter having an inverter input for receiving a DC voltage and an inverter output connected to a series-resonant tank such that an AC voltage is produced;
   a pair of output terminals for receiving said at least one gas discharge lamp and applying said produced AC voltage to said gas discharge lamp;
   re-ignition circuitry for detecting if a lamp is connected between said output terminals and initiating a lamp ignition procedure when a newly installed lamp is detected between said output terminals;
   multiple striking attempt circuitry including a charge collecting capacitor for triggering a predetermined number of striking attempts to attempt to ignite a lamp wherein said striking attempts are terminated when said lamp is ignited or said predetermined number of striking attempt is exceeded;
   end of lamp life detection circuitry for detecting an end of lamp life condition and disabling said ballast when such an end of lamp life condition is detected;
   wherein said end of lamp life circuitry detects excess symmetric lamp voltages and disables the ballast if the detected voltages exceed a predetermined value for a predetermined amount of time.

7. The ballast of claim 6 wherein said end of lamp life circuit detects both positive and negative rectification voltages for one or more lamps and disables the ballast if the detected voltages exceed a predetermined value.

8. The ballast of claim 7 further comprising a DC blocking capacitor for filtering out DC voltages from said inverter.

9. The ballast of claim 6 wherein said multiple striking attempt striking circuitry comprises a charge pump coupled to a lamp filament wherein each striking attempt causes said charge pump to provide an amount of charge to said charge collecting capacitor and said charge collecting capacitor produces a shut down signal for disabling said ballast after receiving an amount of charge from said charge pump.

10. The ballast of claim 6 wherein said re-ignition circuitry utilizes a voltage across said output terminals to detect a continuity of lamp filaments to initiate a ballast ignition procedure and a charge circuit coupled to one of the filaments to suppress a ballast ignition procedure.

11. The ballast of claim 6 wherein said re-ignition circuitry uses a voltage across said output terminals to suppress said ignition procedure after a lamp has been ignited.

12. A method of protecting an electronic ballast for igniting and powering at least one gas discharge lamp from damaging conditions, said method comprising the protection functionalities of:
   monitoring positive and negative voltages developed across a lamp installed in said ballast to determine if an end of lamp life condition has occurred and disabling said ballast if such a condition is detected;
   detecting installation of a new lamp in said ballast and initiating an ignition procedure if a continuity of lamp filaments is established;
   producing ignition strikes when an ignition procedure is initiated until an installed lamp is ignited or until a predetermined number of strikes have been produced; and
   wherein monitoring a voltage across said lamp further comprises detecting excess symmetric lamp voltages and disabling the ballast if the detected voltages exceed a predetermined value for a predetermined amount of time.

13. The method of claim 12 wherein monitoring positive and negative voltages across said lamp further comprises detecting DC rectification voltages developed across one or more lamps and disabling the ballast if the detected rectification voltages exceed a predetermined value.

14. The method of claim 13 further comprising controlling said ballast with an integrated circuit and an internal or external operational amplifier as an inverter.

15. The method of claim 12 wherein producing ignition strikes when an ignition procedure is initiated until an installed lamp is ignited or until a predetermined number of strikes have been produced further comprises collecting charge on a storage capacitor every time an ignition strike is produced and disabling said ballast after a predetermined amount of charge is collected by said storage capacitor.

16. The method of claim 12 wherein detecting installation of a new lamp further comprises utilizing a voltage across a pair of output terminals to detect a continuity of lamp filaments of installed lamps and utilizing a charged capacitor to initiate a ballast ignition procedure.

17. The method of claim 16 further comprising utilizing a voltage on one of said output terminals to suppress said ignition procedure with a diode after a lamp has been ignited.

* * * * *